(12) United States Patent
Yamamoto

(10) Patent No.: US 12,459,059 B2
(45) Date of Patent: Nov. 4, 2025

(54) LASER PROCESSING APPARATUS

(71) Applicant: DISCO CORPORATION, Tokyo (JP)

(72) Inventor: Ryohei Yamamoto, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 299 days.

(21) Appl. No.: 18/307,956

(22) Filed: Apr. 27, 2023

(65) Prior Publication Data

US 2023/0364717 A1  Nov. 16, 2023

(30) Foreign Application Priority Data

May 16, 2022 (JP) ................................ 2022-080022

(51) Int. Cl.
| | |
|---|---|
| B23K 26/53 | (2014.01) |
| B23K 26/03 | (2006.01) |
| B23K 26/08 | (2014.01) |
| B23K 103/00 | (2006.01) |

(52) U.S. Cl.
CPC ............ B23K 26/53 (2015.10); B23K 26/032 (2013.01); B23K 26/083 (2013.01); *B23K 2103/56* (2018.08)

(58) Field of Classification Search
CPC .... B23K 26/53; B23K 26/032; B23K 26/083; B23K 26/0622; B23K 26/0006; B23K 26/0853; B23K 2101/40; B23K 2103/56; B23K 2103/52; G01B 11/002; G01B 11/02; G01B 11/03; G01B 11/22; G01B 11/24; H01L 22/10; H01L 22/12; H01L 22/24; H01L 22/30

See application file for complete search history.

(56) References Cited

U.S. PATENT DOCUMENTS

| | | | |
|---|---|---|---|
| 2015/0168303 A1* | 6/2015 | Trupke ............... | G01R 31/2656 324/762.01 |
| 2021/0121988 A1* | 4/2021 | Hirata ................ | B23K 26/0823 |

FOREIGN PATENT DOCUMENTS

| | | |
|---|---|---|
| JP | 2000094221 A | 4/2000 |
| JP | 2016111143 A | 6/2016 |
| JP | 2021068819 A | 4/2021 |

* cited by examiner

*Primary Examiner* — Galen H Hauth
*Assistant Examiner* — Baileigh Kate Darnell
(74) *Attorney, Agent, or Firm* — Greer Burns & Crain Ltd.

(57) ABSTRACT

A laser processing apparatus includes a first reflected light detection unit having a first light receiving element that detects inspection light reflected by a crack in an inspection region located on one side of a focal point in a direction along an X-axis, a second reflected light detection unit having a second light receiving element that detects the inspection light reflected by the crack in the inspection region located on the other side of the focal point in the direction along the X-axis, and a controller.

16 Claims, 11 Drawing Sheets

LASER PROCESSING APPARATUS

BACKGROUND OF THE INVENTION

Field of the Invention

The present invention relates to a laser processing apparatus used when a workpiece such as a semiconductor ingot is processed.

Description of the Related Art

In general, a semiconductor wafer used for manufacturing of semiconductor devices is obtained by thinly cutting a semiconductor ingot with a circular column shape by a wire saw. In this method, large irregularities are generated in a surface (cut surface) of the semiconductor wafer due to the processing accuracy of the wire saw. Thus, the surface of the semiconductor wafer is planarized by a method such as grinding or polishing after the cutting by the wire saw (for example, refer to Japanese Patent Laid-open No. 2000-94221).

Incidentally, a method like the above-described one in which both cutting by the wire saw and subsequent planarization are executed involves a problem in terms of economy that 70% or more of the semiconductor ingot is discarded in the processing. In particular, in the case of manufacturing a semiconductor wafer from a semiconductor ingot composed of a semiconductor such as silicon carbide (SiC) with high hardness, coupled with a problem that it requires a long time to execute the cutting by the wire saw, the price of the semiconductor wafer is liable to become high.

To address such a problem, in recent years, a technique has been proposed in which a laser beam is focused on an inside of a semiconductor ingot to form a separation band including cracks and so forth and a semiconductor wafer is separated from the semiconductor ingot along this separation band (for example, refer to Japanese Patent Laid-open No. 2016-111143). According to this technique, a "cutting allowance" necessary in the case of cutting the semiconductor ingot by the wire saw becomes unnecessary. Therefore, a large part of the semiconductor ingot is used as the semiconductor wafers, compared with existing techniques, and the economy relating to the manufacturing of the semiconductor wafers is improved.

On the other hand, the crystallinity of the semiconductor ingot composed of a semiconductor such as silicon carbide has a high possibility of being uneven along a height direction of the semiconductor ingot (height direction of the circular column) due to the manufacturing method of this semiconductor ingot. That is, the irradiation condition (processing condition) of the laser beam necessary to form the separation band suitable for separation of a semiconductor wafer in the semiconductor ingot also has a high possibility of being different in the height direction of the semiconductor ingot.

Thus, there has been proposed a laser processing apparatus that can inspect whether or not a proper separation band has been formed by use of light that reflects at a crack or the like of the separation band in processing of a semiconductor ingot (for example, refer to Japanese Patent Laid-open No. 2021-68819). This laser processing apparatus realizes the separation band suitable for separation of a semiconductor wafer even when the crystallinity of the semiconductor ingot is uneven by processing the semiconductor ingot in such a manner that the intensity of reflected light reflected at the separation band falls within a predetermined range.

SUMMARY OF THE INVENTION

However, the above-described laser processing apparatus is often incapable of realizing high productivity in the case of concurrently executing formation of the separation band and inspection of the separation band.

Thus, an object of the present invention is to provide a laser processing apparatus that can realize high productivity even in the case of concurrently executing formation of a separation band and inspection of the separation band.

In accordance with an aspect of the present invention, there is provided a laser processing apparatus including a holding unit having a holding surface which holds a workpiece, a laser beam irradiation unit having a laser oscillator which generates a laser beam with such a wavelength as to be transmitted through the workpiece and a light collector which focuses the laser beam generated by the laser oscillator into a focal point, the laser beam irradiation unit executing irradiation in such a manner as to focus the laser beam on an inside of the workpiece held by the holding unit to form a separation band including a modified part arising from modification and cracks which extend from the modified part inside the workpiece, a feed mechanism which relatively moves the holding unit and the focal point of the laser beam along an X-axis and a Y-axis that intersects the X-axis, an inspection light irradiation unit which has a light source that generates inspection light with such a wavelength as to be transmitted through the workpiece, and irradiates an inspection region including the separation band formed in the workpiece with the inspection light, a first reflected light detection unit having a first light receiving element which detects the inspection light reflected by the crack in the inspection region located on one side of the focal point in a direction along the X-axis, a second reflected light detection unit having a second light receiving element which detects the inspection light reflected by the crack in the inspection region located on the other side of the focal point in the direction along the X-axis, and a controller which has a processing device and a storing device and controls each constituent element according to a program stored in the storing device. According to the program, in forming the separation band through executing irradiation with the laser beam for a planned irradiation region in which the laser beam is to be applied from an outer circumferential edge located on the one side of the workpiece in the direction along the X-axis to the outer circumferential edge located on the other side of the workpiece in the direction along the X-axis, the controller acquires information on the inspection light reflected by the crack in whole of a planned formation region of the separation band from the outer circumferential edge located on the one side of the workpiece in the direction along the X-axis to the outer circumferential edge located on the other side of the workpiece in the direction along the X-axis, by causing the first light receiving element to detect the inspection light reflected by the crack in a first detection range from a first region outside relative to the outer circumferential edge located on the one side of the workpiece in the direction along the X-axis to a second region inside relative to the outer circumferential edge located on the other side of the workpiece in the direction along the X-axis, and by causing the second light receiving element to detect the inspection light reflected by the crack in a second detection range from a third region inside relative to the outer circumferential edge located on the one side of the workpiece in the direction along the X-axis to a fourth region outside relative to the outer circumferential edge located on the other side of the workpiece in the direction along the X-axis.

Preferably, according to the program, the controller calculates a ratio of a region regarded as a region in which the separation band has been actually formed to the planned formation region by using the information acquired. Moreover, preferably, according to the program, the controller irradiates a region in which the ratio does not reach a threshold with the laser beam again when the ratio does not reach the threshold. Further, preferably, according to the program, the controller adjusts a processing condition when the ratio does not reach a threshold.

Moreover, preferably, the first light receiving element and the second light receiving element are configured to be capable of detecting the inspection light reflected by the crack located on one side of the focal point in a direction along the Y-axis. Further, preferably, the first light receiving element and the second light receiving element are configured to be capable of detecting intensity of the inspection light reflected by the crack. Furthermore, preferably, the first light receiving element and the second light receiving element are configured to be capable of generating an image of the inspection region by using the inspection light reflected at the inspection region including the crack.

In accordance with another aspect of the present invention, there is provided a laser processing apparatus including a holding unit having a holding surface which holds a workpiece, a laser beam irradiation unit having a laser oscillator which generates a laser beam with such a wavelength as to be transmitted through the workpiece and a light collector which focuses the laser beam generated by the laser oscillator into a focal point, the laser beam irradiation unit executing irradiation in such a manner as to focus the laser beam inside of the workpiece held by the holding unit to form a separation band including a modified part arising from modification and cracks which extend from the modified part inside the workpiece, a feed mechanism which relatively moves the holding unit and the focal point of the laser beam along an X-axis and a Y-axis that intersects the X-axis, an inspection light irradiation unit which has a light source that generates inspection light with such a wavelength as to be transmitted through the workpiece, and irradiates an inspection region including the separation band formed in the workpiece with the inspection light, a reflected light detection unit having a light receiving element which detects the inspection light reflected by the crack in the inspection region including a region on a straight line that is parallel to the Y-axis and passes through the focal point, and a controller which has a processing device and a storing device and controls each constituent element according to a program stored in the storing device. According to the program, in forming the separation band through executing irradiation with the laser beam for a planned irradiation region in which the laser beam is to be applied from an outer circumferential edge located on one side of the workpiece in a direction along the X-axis to the outer circumferential edge located on the other side of the workpiece in the direction along the X-axis, the controller acquires information on the inspection light reflected by the crack by causing the light receiving element to detect the inspection light reflected by the crack in whole of a planned formation region of the separation band from the outer circumferential edge located on the one side of the workpiece in the direction along the X-axis to the outer circumferential edge located on the other side of the workpiece in the direction along the X-axis.

Preferably, according to the program, the controller calculates a ratio of a region regarded as a region in which the separation band has been actually formed to the planned formation region by using the information acquired. Moreover, preferably, according to the program, the controller irradiates a region in which the ratio does not reach a threshold with the laser beam again when the ratio does not reach the threshold. Further, preferably, according to the program, the controller adjusts a processing condition when the ratio does not reach a threshold.

Moreover, preferably, the light receiving element is configured to be capable of detecting intensity of the inspection light reflected by the crack. Further, preferably, the light receiving element is configured to be capable of generating an image of the inspection region by using the inspection light reflected at the inspection region including the crack.

The laser processing apparatus according to the one aspect of the present invention includes the first reflected light detection unit having the first light receiving element that detects the inspection light reflected by the crack in the inspection region located on one side of the focal point in the direction along the X-axis and the second reflected light detection unit having the second light receiving element that detects the inspection light reflected by the crack in the inspection region located on the other side of the focal point in the direction along the X-axis. Thus, when forming the separation band through executing irradiation with the laser beam for the planned irradiation region in which the laser beam is to be applied from the outer circumferential edge located on the one side of the workpiece in the direction along the X-axis to the outer circumferential edge located on the other side of the workpiece in the direction along the X-axis, the laser processing apparatus can cause the first light receiving element to detect the inspection light reflected by the crack in the first detection range from the first region outside relative to the outer circumferential edge located on the one side of the workpiece in the direction along the X-axis to the second region inside relative to the outer circumferential edge located on the other side of the workpiece in the direction along the X-axis and cause the second light receiving element to detect the inspection light reflected by the crack in the second detection range from the third region inside relative to the outer circumferential edge located on the one side of the workpiece in the direction along the X-axis to the fourth region outside relative to the outer circumferential edge located on the other side of the workpiece in the direction along the X-axis.

Moreover, the laser processing apparatus according to the other aspect of the present invention includes the reflected light detection unit having the light receiving element that detects the inspection light reflected by the crack in the inspection region including the region on the straight line that is parallel to the Y-axis and passes through the focal point. Thus, when forming the separation band through executing irradiation with the laser beam for the planned irradiation region in which the laser beam is to be applied from the outer circumferential edge located on one side of the workpiece in the direction along the X-axis to the outer circumferential edge located on the other side of the workpiece in the direction along the X-axis, the laser processing apparatus can cause the light receiving element to detect the inspection light reflected by the crack in the whole of the planned formation region of the separation band from the outer circumferential edge located on the one side of the workpiece in the direction along the X-axis to the outer circumferential edge located on the other side of the workpiece in the direction along the X-axis.

Therefore, according to the laser processing apparatuses in accordance with the aspects of the present invention, information on the inspection light reflected by the crack can be acquired in the whole of the planned formation region of the separation band when the separation band is formed in the workpiece. That is, according to the laser processing apparatuses in accordance with the aspects of the present invention, high productivity can be realized even in the case of concurrently executing the formation of the separation band and the inspection of the separation band.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
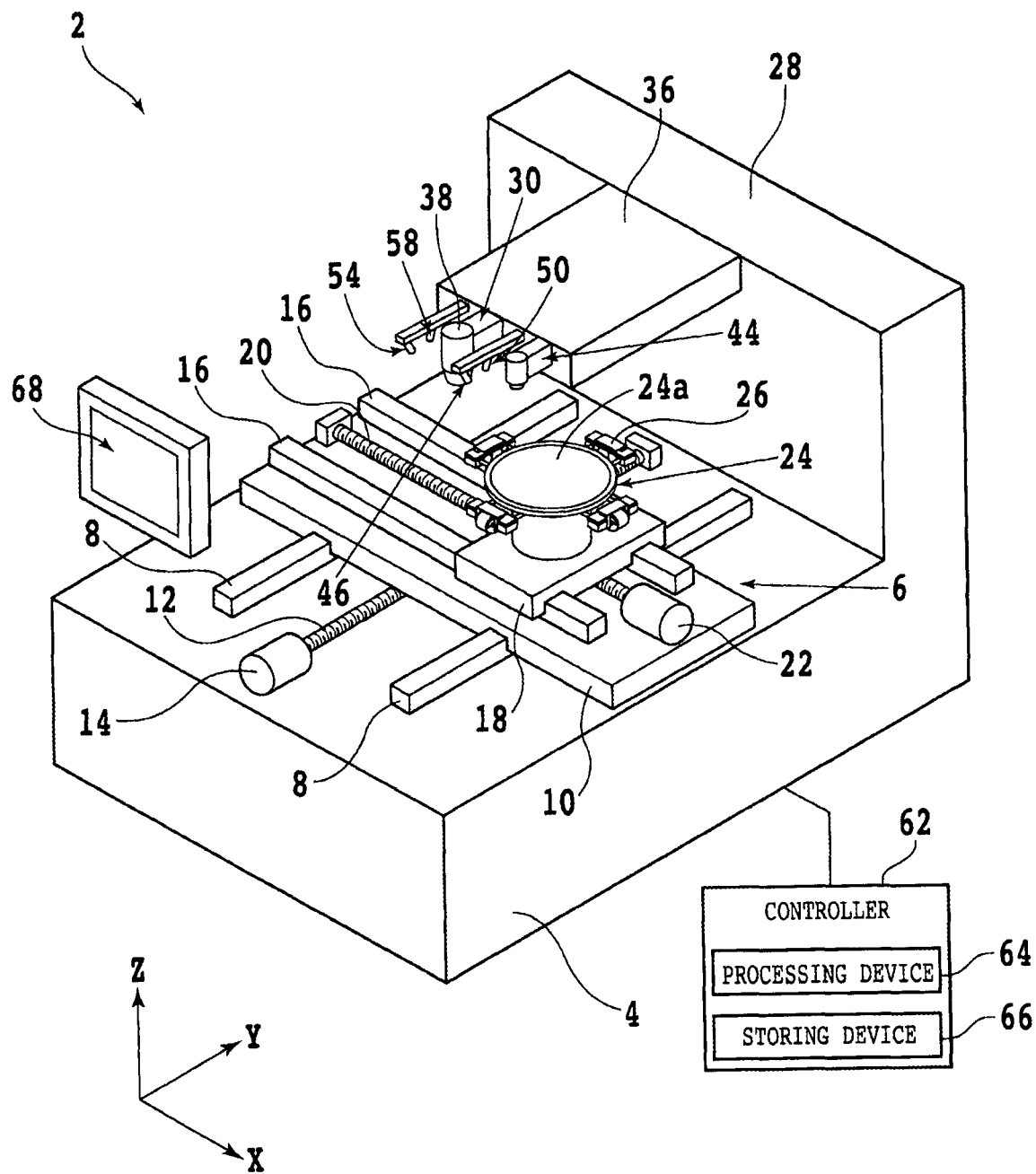
FIG. 1 is a perspective view illustrating a laser processing apparatus according to an embodiment of the present invention.

An embodiment of the present invention will be described below with reference to the accompanying drawings. FIG. 1 is a perspective view illustrating a laser processing apparatus 2 of the present embodiment. In FIG. 1, some of constituent elements of the laser processing apparatus 2 is represented by functional blocks. Moreover, an X-axis, a Y-axis, and a Z-axis used in the following description are perpendicular to each other.

As illustrated in FIG. 1, the laser processing apparatus 2 includes a base 4 on which the respective constituent elements are mounted. A feed mechanism (processing feed mechanism, indexing feed mechanism) 6 is disposed in a central region in an upper surface of the base 4. The feed mechanism 6 includes a pair of Y-axis guide rails 8 that are fixed to the upper surface of the base 4 and are long in a front-rear direction (a direction along the Y-axis). A Y-axis moving plate 10 is attached to the Y-axis guide rails 8 slidably forward and rearward along the Y-axis.

A nut part (not illustrated) that configures a ball screw is provided on a lower surface side of the Y-axis moving plate 10. A screw shaft 12 substantially parallel to the Y-axis guide rails 8 is rotatably coupled to this nut part. A Y-axis pulse motor 14 is connected to one end part of the screw shaft 12. Rotating the screw shaft 12 by the Y-axis pulse motor 14 causes the Y-axis moving plate 10 to move forward and rearward along the Y-axis guide rails 8.

A pair of X-axis guide rails 16 that are long in a left-right direction (direction along the X-axis) are provided on an upper surface of the Y-axis moving plate 10. An X-axis moving plate 18 is attached to the X-axis guide rails 16 slidably left and right along the X-axis. A nut part (not illustrated) that configures a ball screw is provided on a lower surface side of the X-axis moving plate 18.

A screw shaft 20 substantially parallel to the X-axis guide rails 16 is rotatably coupled to this nut part. An X-axis pulse motor 22 is connected to one end part of the screw shaft 20. Rotating the screw shaft 20 by the X-axis pulse motor 22 causes the X-axis moving plate 18 to move left and right along the X-axis guide rails 16.

Figure 2:
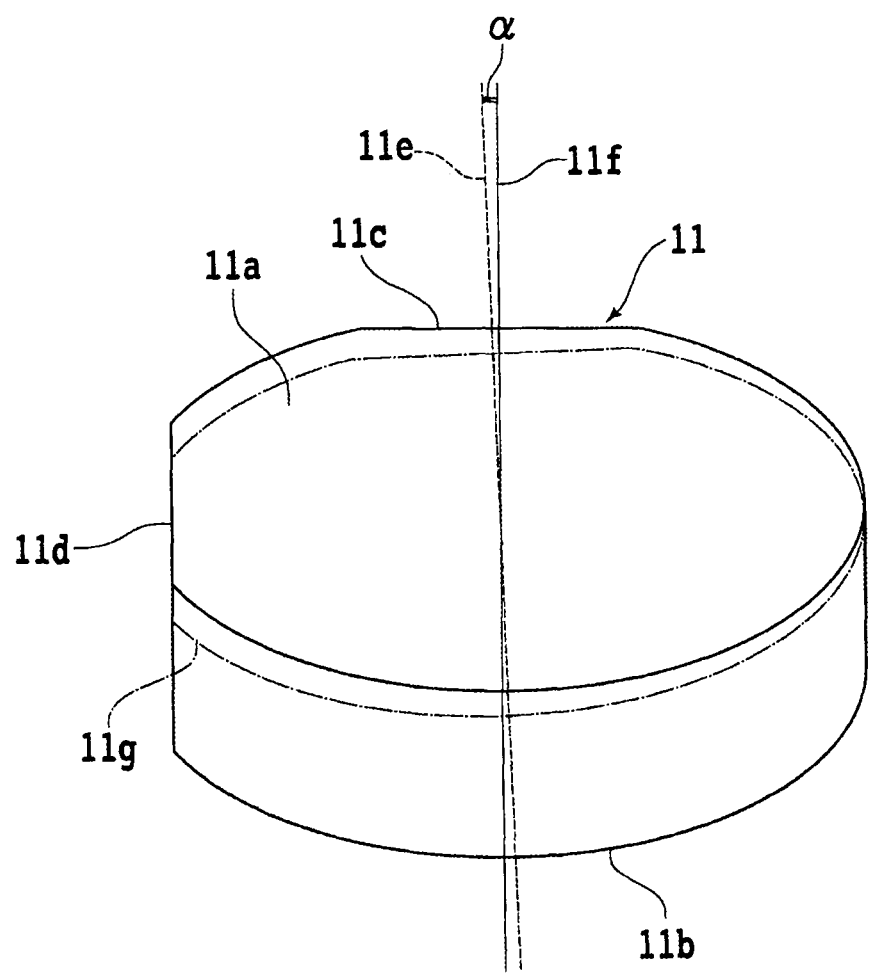
FIG. 2 is a perspective view illustrating a workpiece.
Figure 3:
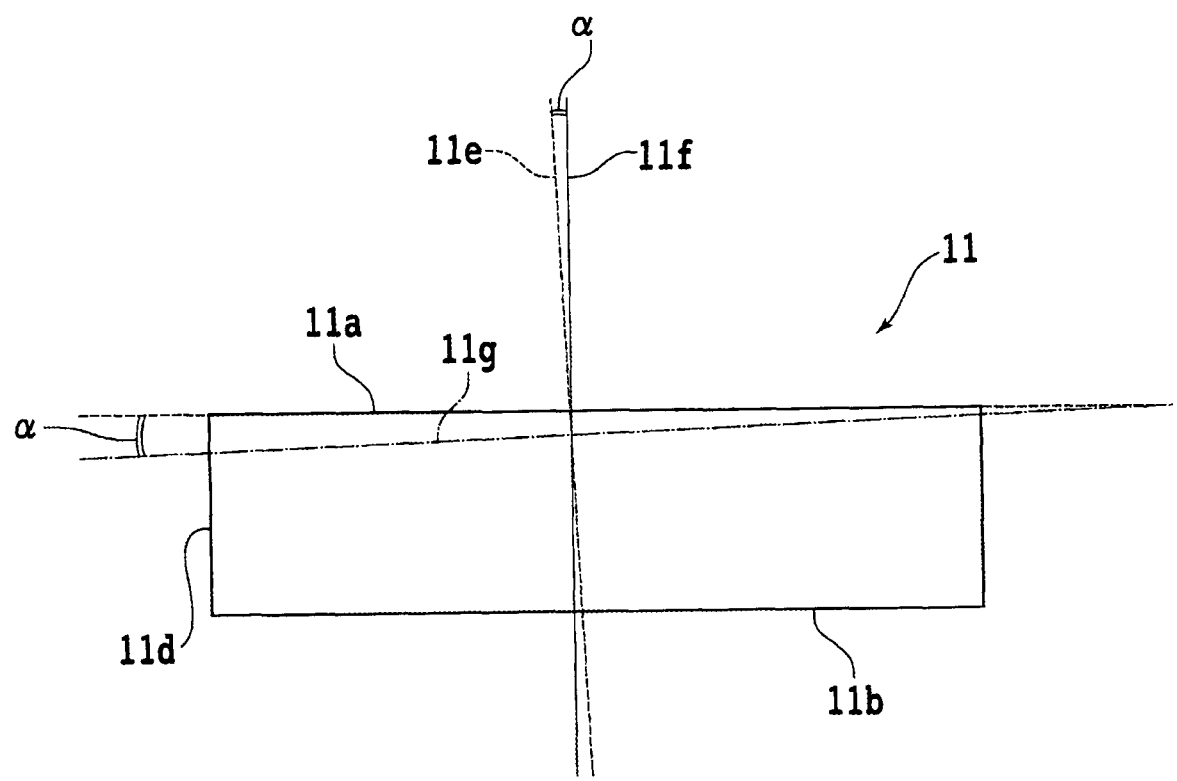
FIG. 3 is a side view illustrating the workpiece.

A circular disc-shaped chuck table (holding unit) 24 configured to be capable of holding a workpiece 11 is disposed on an upper surface side of the X-axis moving plate 18. FIG. 2 is a perspective view illustrating the workpiece 11 to be processed by the laser processing apparatus 2. FIG. 3 is a side view illustrating the workpiece 11.

The workpiece 11 of the present embodiment is a circular columnar semiconductor ingot composed of hexagonal single-crystal silicon carbide (SiC) and is typically manufactured by a sublimation-recrystallization method. As illustrated in FIG. 2 and FIG. 3, this workpiece 11 has a circular first surface 11a and a circular second surface 11b that is located on the opposite side to the first surface 11a and is substantially parallel to the first surface 11a.

A first orientation flat 11c and a second orientation flat 11d are provided in a side surface that links the first surface 11a and the second surface 11b of the workpiece 11. The first orientation flat 11c and the second orientation flat 11d are provided according to the crystal orientation of the single-crystal silicon carbide that configures the workpiece 11 and both have a straight line shape as viewed from a direction perpendicular to the first surface 11a and the second surface 11b.

Moreover, the first orientation flat 11c and the second orientation flat 11d are substantially perpendicular to each other. Moreover, the length of the first orientation flat 11c as viewed from the direction perpendicular to the first surface 11a and the second surface 11b is longer than that of the second orientation flat 11d as viewed from the same direction.

In the process of growing a crystal to manufacture the workpiece 11, a c-axis 11e of the single-crystal silicon carbide that configures this workpiece 11 is inclined in a direction toward the second orientation flat 11d by an angle of $\alpha$ (referred to as off-angle or the like) with respect to a perpendicular line 11f to the first surface 11a and the second surface 11b. That is, a c-plane 11g perpendicular to the c-axis 11e also forms the angle of $\alpha$ with respect to the first surface 11a and the second surface 11b. $\alpha$ is typically 4°. However, $\alpha$ can freely be set in a range of 1° to 6°.

The laser processing apparatus 2 of the present embodiment is used when a semiconductor wafer is manufactured from such a workpiece 11. Although a semiconductor ingot composed of hexagonal single-crystal silicon carbide is employed as the workpiece 11 in the present embodiment, the workpiece 11 may be a semiconductor ingot composed of another semiconductor such as silicon (Si) or gallium nitride (GaN). It suffices for a height (size in the direction perpendicular to the first surface 11a and the second surface 11b) of the workpiece 11 to be larger than at least a height (thickness) of the semiconductor wafer to be manufactured.

Moreover, the first orientation flat 11c and the second orientation flat 11d do not necessarily need to be formed in the side surface of the workpiece 11. Moreover, another orientation flat, a notch (cutout), or the like according to the crystal orientation may be made in the workpiece 11, instead of the first orientation flat 11c and the second orientation flat 11d or in addition to them.

For example, the side of the second surface 11b of this workpiece 11 is held by an upper surface (holding surface) 24a of the above-described chuck table 24. The upper surface 24a of the chuck table 24 is formed substantially in parallel to the X-axis and the Y-axis by a porous ceramic or the like, for example. Moreover, the upper surface 24a of the chuck table 24 is connected to a suction source (not illustrated) such as a vacuum pump through a suction path (not illustrated) inside the chuck table 24, a valve (not illustrated) outside the chuck table 24, and so forth.

A rotational drive source (not illustrated) such as a motor is coupled to a lower part of the chuck table 24. The chuck table 24 rotates around a rotation axis substantially parallel to an upward-downward direction (a direction along the Z-axis) by a force generated by this rotational drive source. Moreover, the chuck table 24 moves (processing feeds) in the left-right direction along the X-axis by a force generated by the X-axis pulse motor 22 of the feed mechanism 6 and moves (indexing feeds) in the front-rear direction along the Y-axis by a force generated by the Y-axis pulse motor 14 of the feed mechanism 6.

Four clamps 26 that can fix, from four sides, an annular frame (not illustrated) used in supporting the workpiece 11 are provided around the chuck table 24. When the workpiece 11 is supported by the annular frame, for example, a central part of a circular tape (not illustrated) is stuck to the side of the second surface 11b of the workpiece 11, and the annular frame is fixed to an outer edge part of this tape. When the annular frame is not used in supporting the workpiece 11, the clamps 26 may be omitted.

A support structure 28 having a predetermined length in the upward-downward direction is provided at a position on the rear side of the feed mechanism 6 on the upper surface of the base 4. Part of a laser beam irradiation unit 30 that can irradiate the workpiece 11 held by the chuck table 24 with a laser beam in such a manner as to focus the laser beam on the workpiece 11 is supported by the support structure 28.

Figure 4:
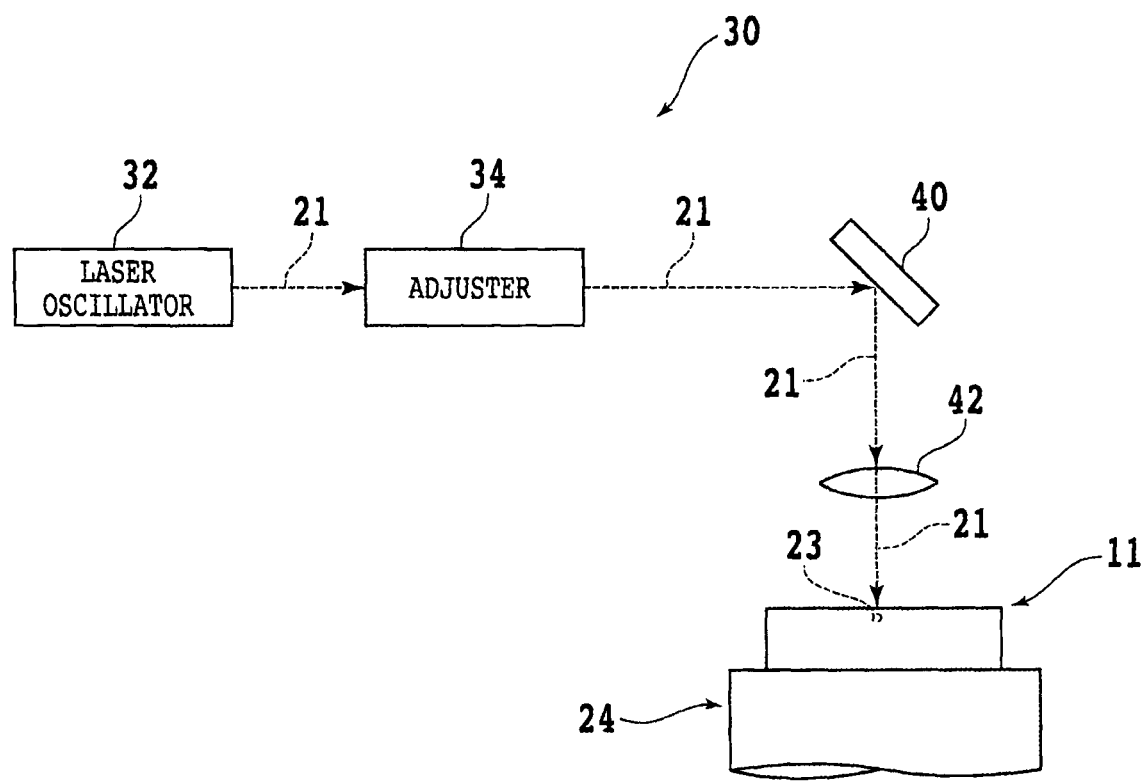
FIG. 4 is a diagram illustrating a structure of a laser beam irradiation unit.

FIG. 4 is a diagram illustrating a structure of the laser beam irradiation unit 30. Also in FIG. 4, some of constituent elements of the laser beam irradiation unit 30 are represented by functional blocks. As illustrated in FIG. 4, the laser beam irradiation unit 30 includes a laser oscillator 32 fixed to the base 4 or the support structure 28, for example. The laser oscillator 32 typically includes a laser medium such as neodymium-doped yttrium aluminum garnet (Nd: YAG) suitable for laser oscillation and generates a pulsed laser beam 21 with such a wavelength as to be transmitted through the workpiece 11.

On the downstream side of the laser oscillator 32 along a direction in which the laser beam 21 travels, for example, an adjuster 34 that can adjust the power of the laser beam 21 generated by the laser oscillator 32 is disposed. An attenuator, an acoustic optical deflector, or the like is used as this adjuster 34. However, the power of the laser beam 21 may be adjusted inside the laser oscillator 32.

The laser beam 21 whose power has been adjusted by the adjuster 34 is incident on a housing 36 (FIG. 1) supported by the support structure 28, for example. An irradiation head 38 (FIG. 1) is provided at an end part of the housing 36 on the tip side. For example, a mirror 40 is disposed at an upper part of the irradiation head 38, and the direction in which the laser beam 21 travels is changed to a downward direction by this mirror 40.

A light collector 42 such as a lens that focuses the laser beam 21 into a focal point 23 on the lower side is disposed at a lower part of the irradiation head 38, and the workpiece 11 held by the chuck table 24 is irradiated with the laser beam 21 reflected by the mirror 40 through the light collector 42. By executing the irradiation in such a manner that the laser beam 21 with such a wavelength as to be transmitted through the workpiece 11 is focused on an inside of the workpiece 11, a separation band including a modified part modified by the laser beam 21 and cracks that extend from the modified part is formed inside the workpiece 11.

Figure 5:
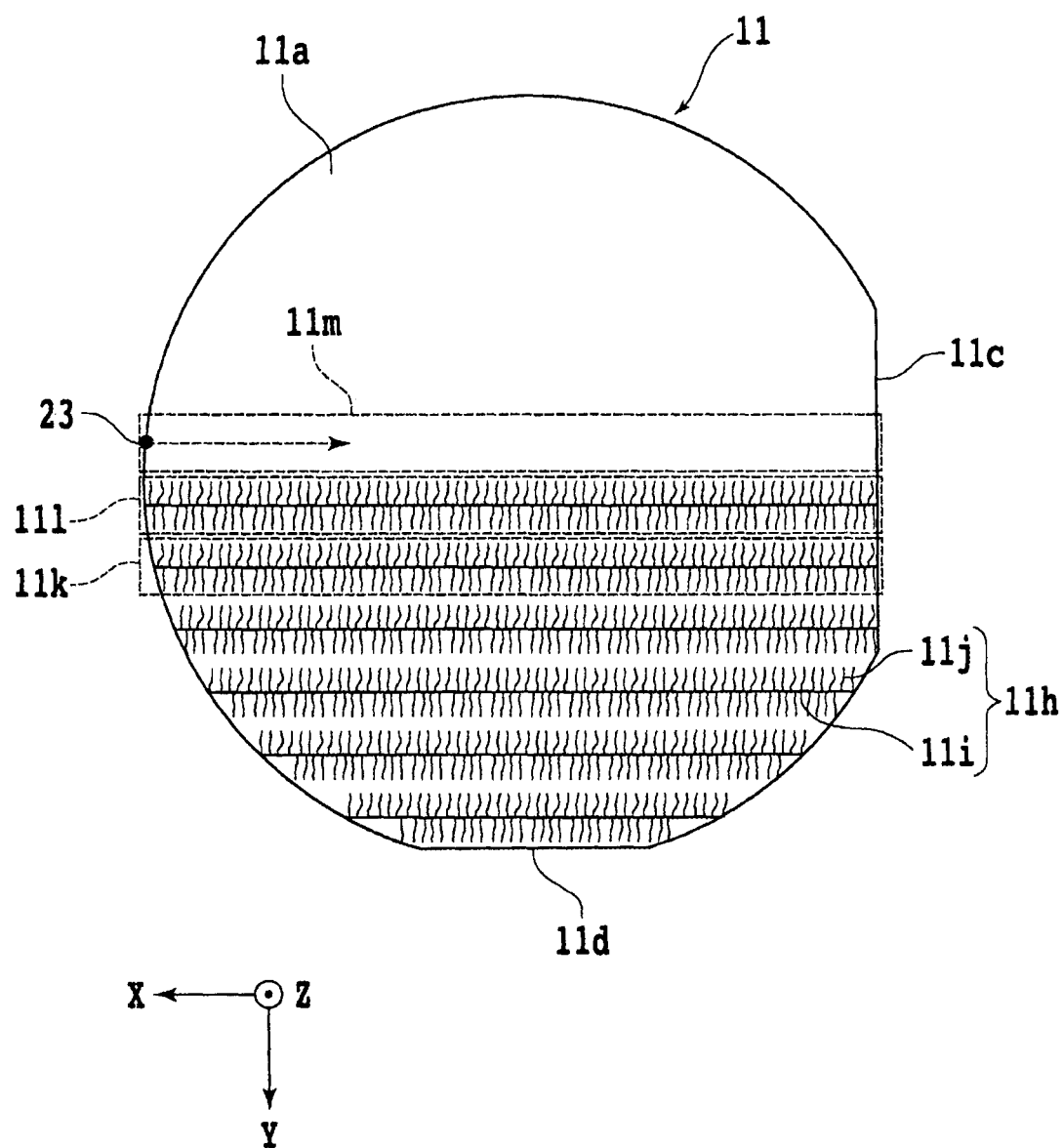
FIG. 5 is a plan view schematically illustrating a state in which separation bands are formed in the workpiece.
Figure 6:
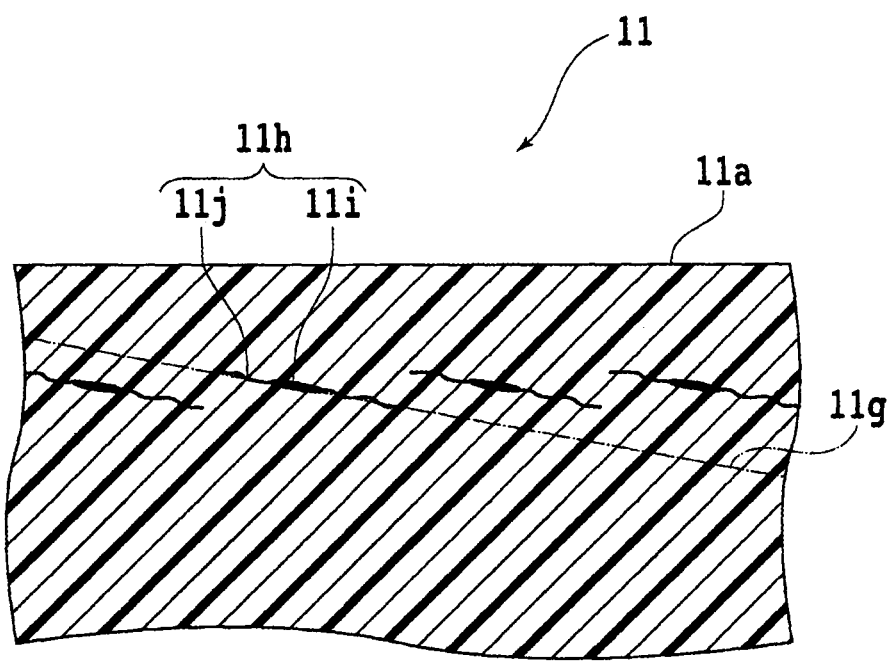
FIG. 6 is a sectional view of the workpiece in which the separation bands have been formed.

FIG. 5 is a plan view schematically illustrating a state in which separation bands 11h are formed in the workpiece 11. FIG. 6 is a sectional view of the workpiece 11 in which the separation bands 11h have been formed. When the separation band 11h is formed inside the workpiece 11, for example, the feed mechanism 6 moves the chuck table 24 that holds the workpiece 11 along the X-axis in a state in which the laser beam irradiation unit 30 is emitting the laser beam 21 downward from the irradiation head 38.

That is, the focal point 23 of the laser beam 21 and the chuck table 24 are relatively moved along the X-axis by the feed mechanism 6. Thereby, a linear (strip-shaped) planned irradiation region along the X-axis in the workpiece 11 is irradiated with the laser beam 21, and the separation band 11h including a modified part 11i and cracks 11j that extend from the modified part 11i is formed in this planned irradiation region. Before the irradiation with the laser beam 21, the orientation of the workpiece 11 is adjusted to cause the second orientation flat 11d to become parallel to the X-axis.

For example, after a first planned irradiation region 11k is irradiated with the laser beam 21, the feed mechanism 6 moves the chuck table 24 in a state in which it holds the workpiece 11 along the Y-axis. That is, the focal point 23 of the laser beam 21 and the chuck table 24 are relatively moved along the Y-axis by the feed mechanism 6.

Then, in a state in which the laser beam irradiation unit 30 is emitting the laser beam 21 downward from the irradiation head 38, the feed mechanism 6 moves the chuck table 24 that holds the workpiece 11 along the X-axis again. Thereby, a second planned irradiation region 11l different from the above-described first planned irradiation region 11k is irradiated with the laser beam 21, and the separation band 11h is formed in this second planned irradiation region 11l. The laser processing apparatus 2 can form the separation bands 11h in a wide range in the workpiece 11 by repeating such operation.

Although the housing 36 that configures the laser beam irradiation unit 30 is supported by the support structure 28 in the present embodiment, the housing 36 may be supported in such a manner as to be capable of vertically moving by an optional movement mechanism. Moreover, the irradiation head 38 may be provided with an actuator or the like so as to allow the light collector 42 inside the irradiation head 38 to vertically move independently.

As illustrated in FIG. 1, a camera (imaging unit) 44 fixed to the housing 36 is disposed in a region on one side (for example, a region on the right side) of the irradiation head 38 in the direction along the X-axis. The camera 44 includes, for example, a two-dimensional optical sensor such as a complementary metal-oxide-semiconductor (CMOS) image sensor or a charge coupled device (CCD) image sensor having sensitivity to visible light and is used when the workpiece 11 or the like held by the chuck table 24 is imaged.

Figure 7:
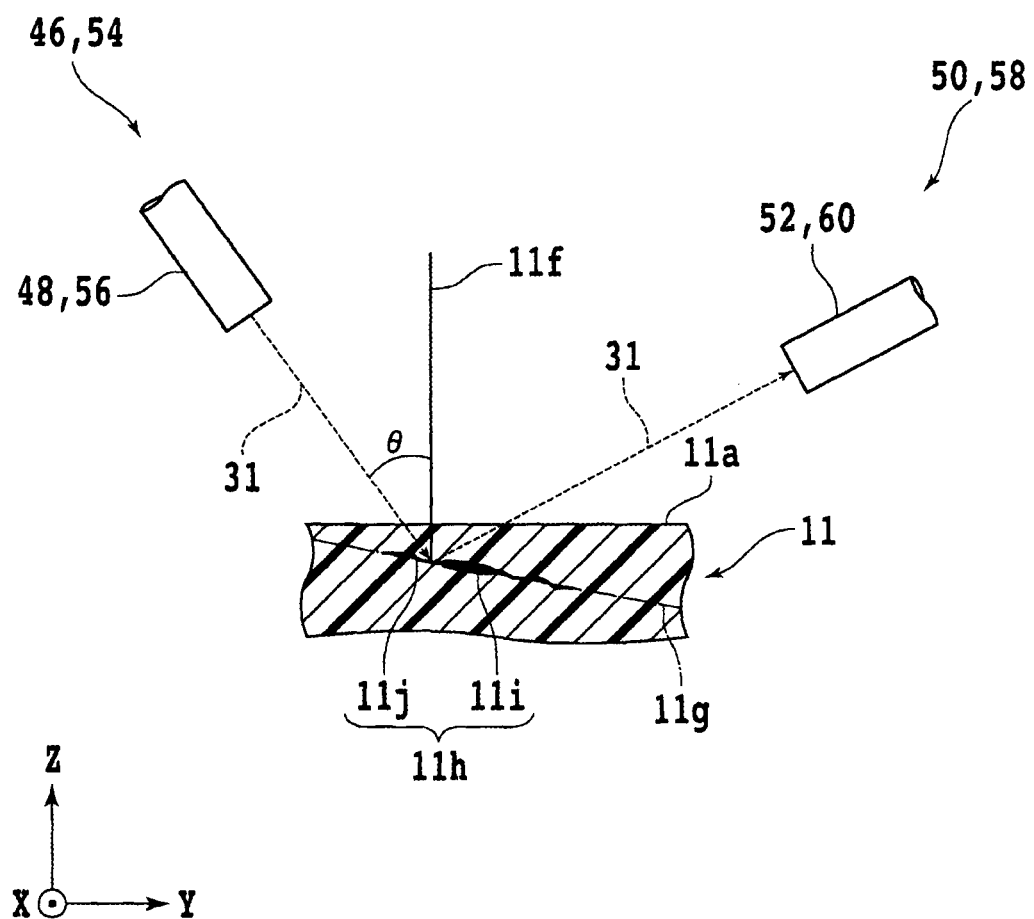
FIG. 7 is a diagram illustrating a structure and arrangement of a first inspection light irradiation unit and so forth.

Moreover, for example, a first inspection light irradiation unit 46 that can irradiate an inspection region including the separation band 11h formed in the workpiece 11 with inspection light is disposed in a region between the irradiation head 38 and the camera 44. FIG. 7 is a diagram illustrating a structure and arrangement of the first inspection light irradiation unit 46 and so forth. The first inspection light irradiation unit 46 includes a first light source 48 such as a light emitting diode (LED) that can generate inspection light 31 with such a wavelength as to be transmitted through the workpiece 11, and irradiates an inspection region located on one side of the focal point 23 in the direction along the X-axis with the inspection light 31.

As illustrated in FIG. 7, part of the inspection light 31 incident on the first surface 11a of the workpiece 11 at an angle θ of incidence in the inspection region reaches the crack 11j of the separation band 11h. The part of the inspection light 31 that has reached the crack 11j is reflected by a cleavage surface due to this crack 11j. The direction in which the inspection light 31 (reflected light) reflected by the cleavage surface of the crack 11j travels substantially depends on the angle formed by the cleavage surface of the crack 11j with respect to the first surface 11a and the angle θ of incidence of the inspection light 31, for example.

Here, the angle formed by the cleavage surface of the crack 11j with respect to the first surface 11a is equivalent to the off-angle α. That is, the direction in which the inspection light 31 reflected by the cleavage surface of the crack 11j travels substantially depends on the off-angle α and the angle θ of incidence of the inspection light 31. Moreover, a first reflected light detection unit 50 is disposed at the destination of the traveling of the inspection light 31 reflected by the cleavage surface of the crack 11j as illustrated in FIG. 7.

The first reflected light detection unit 50 includes a first light receiving element 52 such as a photodiode having sensitivity to the wavelength of the inspection light 31, and receives the inspection light 31 reflected by the cleavage surface of the crack 11j and generates a predetermined electrical signal corresponding to the amount of received light. As above, the intensity of the inspection light 31 reflected by the cleavage surface of the crack 11j in the inspection region located on the one side of the focal point 23 in the direction along the X-axis is detected by the first light receiving element 52.

Moreover, a second inspection light irradiation unit 54 that can irradiate an inspection region including the separation band 11h formed in the workpiece 11 with the inspection light 31 is disposed in a region on the other side (for example, a region on the left side) of the irradiation head 38 in the direction along the X-axis. The second inspection light irradiation unit 54 is configured similarly to the first inspection light irradiation unit 46.

That is, the second inspection light irradiation unit 54 includes a second light source 56 such as the LED that can generate the inspection light 31 with such a wavelength as to be transmitted through the workpiece 11, and irradiates an inspection region located on the other side of the focal point 23 in the direction along the X-axis with the inspection light 31. Part of the inspection light 31 incident on the first surface 11a of the workpiece 11 at the angle θ of incidence in the inspection region reaches the crack 11j of the separation band 11h.

Moreover, the part of the inspection light 31 that has reached the crack 11j is reflected by a cleavage surface due to this crack 11j. A second reflected light detection unit 58 is disposed at the destination of the traveling of the inspection light 31 reflected by the cleavage surface of the crack 11j. The second reflected light detection unit 58 is configured similarly to the first reflected light detection unit 50.

That is, the second reflected light detection unit 58 includes a second light receiving element 60 such as a photodiode having sensitivity to the wavelength of the inspection light 31, and receives the inspection light 31 reflected by the cleavage surface of the crack 11j and generates a predetermined electrical signal corresponding to the amount of received light. As above, the intensity of the inspection light 31 reflected by the cleavage surface of the crack 11j in the inspection region located on the other side of the focal point 23 in the direction along the X-axis is detected by the second light receiving element 60.

Moreover, in the present embodiment, the inspection region irradiated with the inspection light 31 by the first inspection light irradiation unit 46 and the second inspection light irradiation unit 54 is set on one side of the focal point 23 in the direction along the Y-axis. That is, the first light receiving element 52 of the first reflected light detection unit 50 and the second light receiving element 60 of the second reflected light detection unit 58 are configured to be capable of detecting the inspection light 31 reflected by the crack 11j of the separation band 11h located on the one side of the focal point 23 in the direction along the Y-axis.

This makes it possible to irradiate a planned irradiation region in which the separation band 11h has not been formed with the laser beam 21 and form the separation band 11h therein, concurrently with inspection of the separation band 11h resulting from irradiation with the laser beam 21. That is, it becomes possible to concurrently execute the formation of the separation band 11h and the inspection of the separation band 11h.

However, the structures, arrangements, and so forth of the first inspection light irradiation unit 46, the first reflected light detection unit 50, the second inspection light irradiation unit 54, and the second reflected light detection unit 58 are not limited to the above-described form. For example, the first inspection light irradiation unit 46 and the second inspection light irradiation unit 54 may include a laser oscillator or the like that can generate a laser beam with such a wavelength as to be transmitted through the workpiece 11 as the first light source 48 and the second light source 56.

Similarly, the first reflected light detection unit 50 and the second reflected light detection unit 58 may include a two-dimensional optical sensor such as a CMOS image sensor or CCD image sensor having sensitivity to the wavelength of the inspection light 31 as the first light receiving element 52 and the second light receiving element 60. In this case, the first reflected light detection unit 50 and the second reflected light detection unit 58 become capable of generating an image of the inspection region by use of the inspection light 31 reflected at the inspection region including the separation band 11h (crack 11j). In addition, the camera 44 may be used as the first reflected light detection unit 50.

Moreover, it is desirable that the first inspection light irradiation unit 46, the first reflected light detection unit 50, the second inspection light irradiation unit 54, and the second reflected light detection unit 58 are configured to allow the positions thereof relative to the irradiation head 38 to be adjusted in the left-right and front-rear directions (the direction along the X-axis and the direction along the Y-axis). This allows adjustment of the position of the inspection region.

A controller (control unit) 62 is connected to constituent elements such as the feed mechanism 6, the laser beam irradiation unit 30, the camera 44, the first inspection light irradiation unit 46, the first reflected light detection unit 50, the second inspection light irradiation unit 54, and the second reflected light detection unit 58. The controller 62 includes, for example, a computer including a processing device 64 and a storing device 66 and controls operation and so forth of the above-described constituent elements to cause the workpiece 11 to be properly processed.

The processing device 64 is typically a central processing unit (CPU) and executes various kinds of processing necessary to control the above-described constituent elements. The storing device 66 includes a main storing device such as a dynamic random access memory (DRAM) and an auxiliary storing device such as a hard disk drive or a flash memory, for example. Functions of this controller 62 are implemented through operation of the processing device 64 in accordance with software such as a program stored in the storing device 66, for example.

For example, an upper part of the base 4 is covered by a cover (not illustrated) that can house the constituent elements. A touch screen (an input device and an output device) 68 that becomes a user interface is disposed on a side surface of this cover. The controller 62 is connected also to the touch screen 68 and, for example, various conditions applied when the workpiece 11 is processed are input from an operator to the controller 62 through the touch screen 68.

A keyboard, a mouse, and so forth may be employed as the input device. Similarly, as the output device, a display device such as a liquid crystal display that does not have an input function, a speaker that can transmit information by sound, an indicator lamp that can transmit information by color of light or a state of luminescence (light emission, blinking, turning-off, and so forth), or the like may be employed.

In the laser processing apparatus 2 configured as above, the workpiece 11 is irradiated with the laser beam 21, and the separation bands 11h are formed in a predetermined form prescribed by a program. For example, a program that causes the processing device 64 to execute a series of processing necessary for irradiation with the laser beam 21 is recorded in part of the storing device 66, which is also a non-transitory recording medium that can be read by a computer or the like. The controller 62 (processing device 64) performs the procedure necessary for irradiation of the workpiece 11 with the laser beam 21 in accordance with this program.

Moreover, this laser processing apparatus 2 can inspect whether or not the separation band 11h has been properly formed, concurrently with the irradiation of the workpiece 11 with the laser beam 21 (formation of the separation band 11h). A program that causes the processing device 64 to execute a series of processing necessary for the inspection of the separation band 11h is recorded in part of the storing device 66. The controller 62 (processing device 64) performs the procedure necessary for the inspection of the separation band 11h in accordance with this program.

Figure 8:
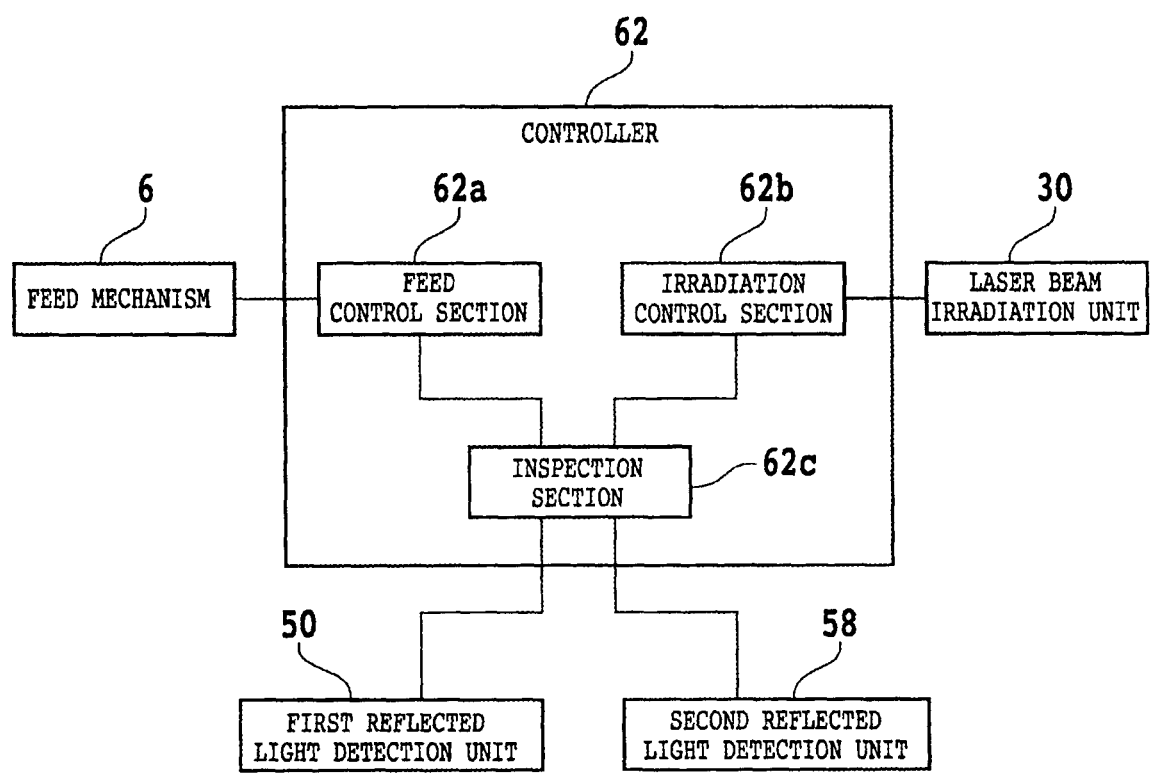
FIG. 8 is a functional block diagram schematically illustrating a functional structure of a controller.
Figure 9:
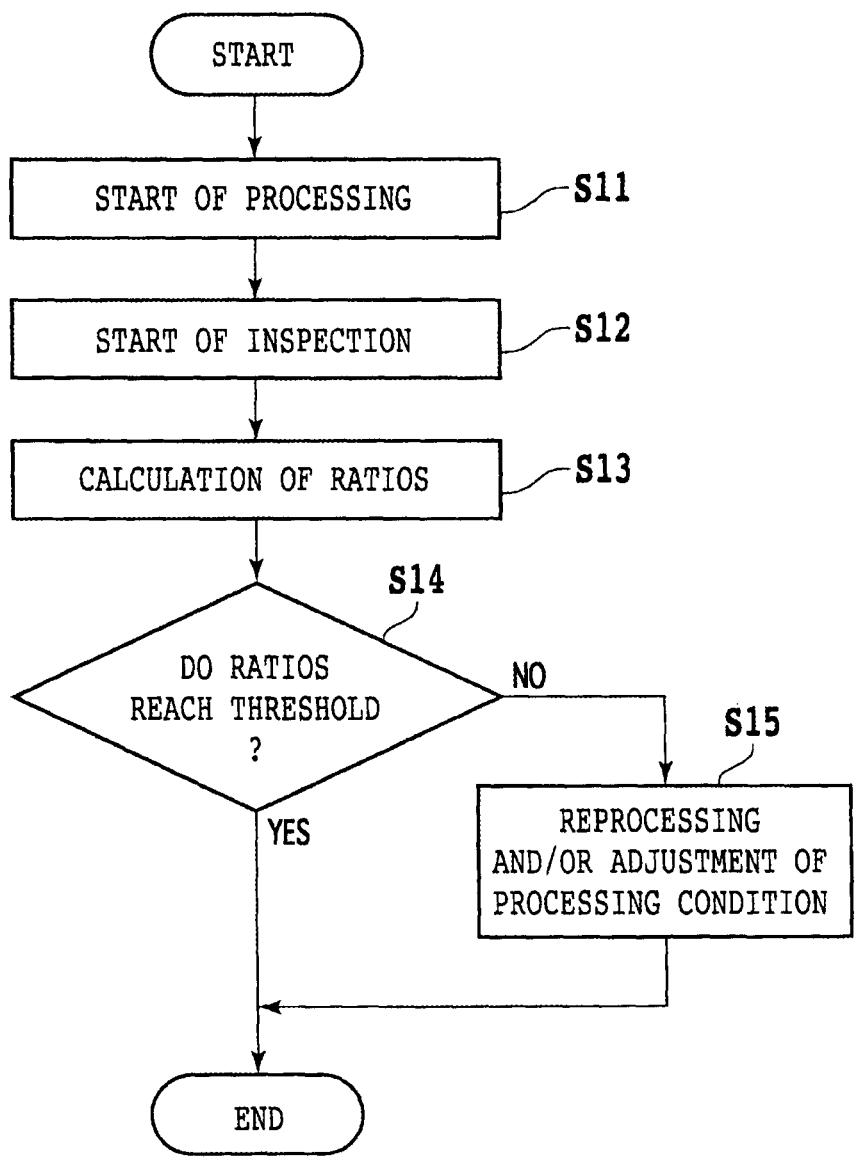
FIG. 9 is a flowchart illustrating a processing method of the workpiece involving inspection of the separation bands.

FIG. 8 is a functional block diagram schematically illustrating a functional structure of the controller 62 implemented by a program of the present embodiment. FIG. 9 is a flowchart illustrating a processing method of the workpiece 11 involving inspection of the separation bands 11h. In FIG. 8, the feed mechanism 6, the laser beam irradiation unit 30, the first reflected light detection unit 50, the second reflected light detection unit 58, and so forth connected to the controller 62 are illustrated in conjunction with the controller 62 for convenience of explanation.

As illustrated in FIG. 8, the controller 62 includes a feed control section 62a that controls operation of the feed mechanism 6 and an irradiation control section 62b that controls operation of the laser beam irradiation unit 30. For example, upon the start of processing of the workpiece 11 (formation of the separation band 11h) along the flow of the processing method illustrated in FIG. 9 (step S11), the feed control section 62a controls operation of the feed mechanism 6, and the irradiation control section 62b controls operation of the laser beam irradiation unit 30 to irradiate the workpiece 11 with the laser beam 21.

For example, the feed control section 62a adjusts a positional relation between the chuck table 24 that holds the workpiece 11 and the focal point 23 by the feed mechanism 6 to set a position of the focal point 23 on an extended line along the X-axis regarding a planned irradiation region in the workpiece 11 as a target of irradiation. Thereafter, the feed control section 62a relatively moves the chuck table 24 and the focal point 23 along the X-axis by the feed mechanism 6 to cause the focal point 23 to move along the planned irradiation region serving as the target.

After the relative movement of the chuck table 24 and the focal point 23 along the X-axis is started, the irradiation control section 62b starts irradiation with the laser beam 21 by the laser beam irradiation unit 30 at a timing at which the focal point 23 enters the inside of the outer circumferential edge of the workpiece 11, for example. Thereafter, the irradiation control section 62b stops the irradiation with the laser beam 21 by the laser beam irradiation unit 30 at a timing at which the focal point 23 comes to the outside of the outer circumferential edge of the workpiece 11.

That is, the workpiece 11 is irradiated with the laser beam 21 in such a manner that the laser beam 21 is focused into the focal point 23 that relatively moves in a state in which the focal point 23 overlaps with the planned irradiation region serving as the target. In the workpiece 11, multiple linear (strip-shaped) planned irradiation regions are set in parallel to the direction along the X-axis. That is, the multiple planned irradiation regions line up along the Y-axis. Moreover, each planned irradiation region is set to include a range from the outer circumferential edge located on one side of the workpiece 11 in the direction along the X-axis to the outer circumferential edge located on the other side of the workpiece 11 in the direction along the X-axis.

Thus, each planned irradiation region is irradiated with the laser beam 21 along the X-axis from the outer circumferential edge located on the one side of the workpiece 11 in the direction along the X-axis to the outer circumferential edge located on the other side of the workpiece 11 in the direction along the X-axis. As a result, the separation band 11h that traverses the workpiece 11 is formed along the X-axis in each planned irradiation region.

Figure 10:
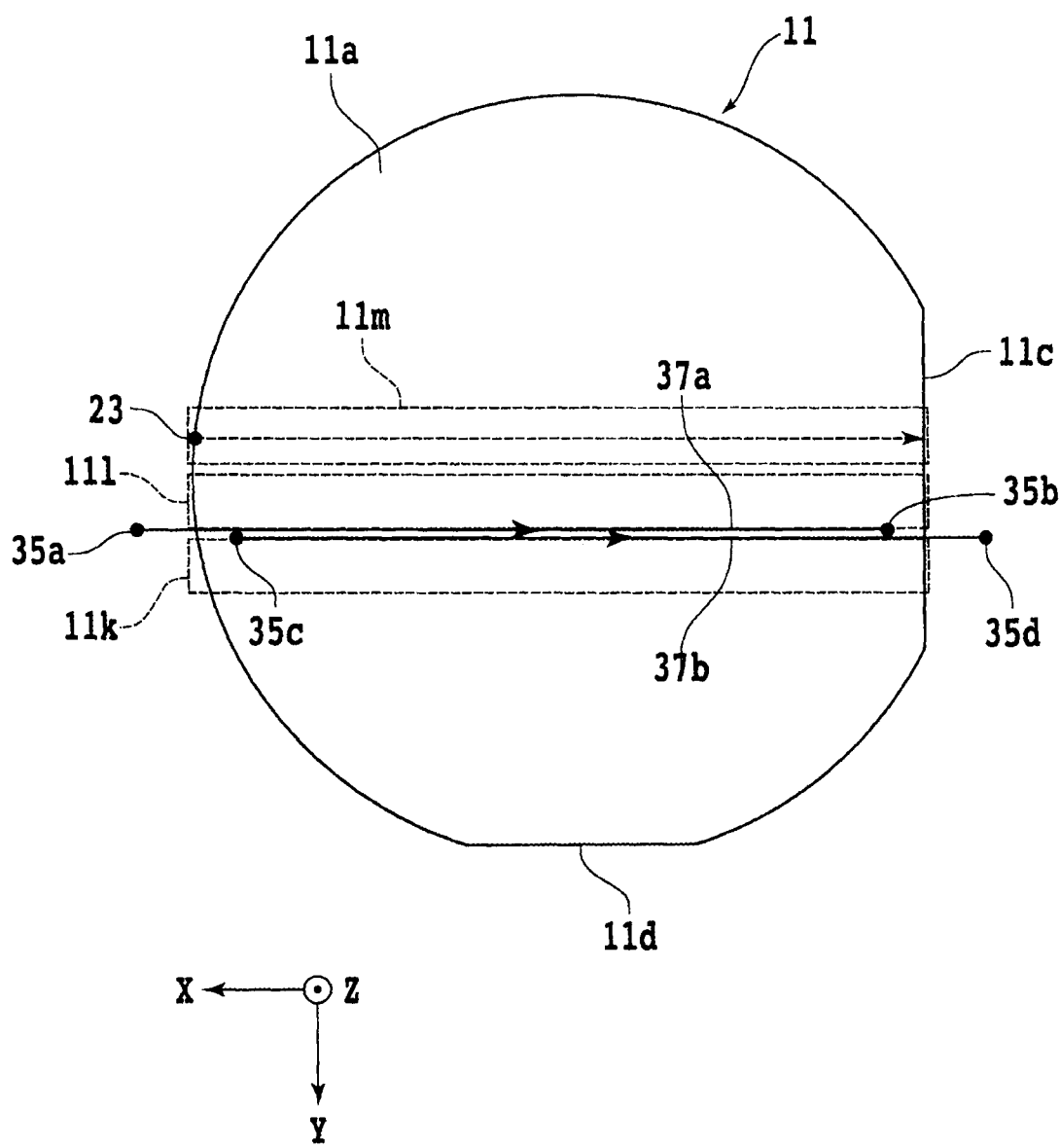
FIG. 10 is a plan view schematically illustrating a state in which the separation bands are inspected.

For example, after the first planned irradiation region 11k and the second planned irradiation region 11l are irradiated with the laser beam 21, inspection of the separation bands 11h formed in these first planned irradiation region 11k and second planned irradiation region 11l is started (step S12). FIG. 10 is a plan view schematically illustrating the state in which the separation bands 11h are inspected. In the present embodiment, the inspection of the separation bands 11h of the first planned irradiation region 11k and the second planned irradiation region 11l is executed concurrently with formation of the separation band 11h in a third planned irradiation region 11m adjacent to the second planned irradiation region 11l.

Specifically, first, the feed control section 62a relatively moves the chuck table 24 and the focal point 23 along the Y-axis by the feed mechanism 6 to set the position of the focal point 23 on an extended line along the X-axis regarding the third planned irradiation region 11m. Moreover, due to this, the positions of the inspection region (first inspection region) irradiated with the inspection light 31 from the first inspection light irradiation unit 46 and the inspection region (second inspection region) irradiated with the inspection light 31 from the second inspection light irradiation unit 54 are set on an extended line along the X-axis regarding the boundary between the first planned irradiation region 11k and the second planned irradiation region 11l.

That is, the irradiation head 38, the first inspection light irradiation unit 46, and the second inspection light irradiation unit 54 are disposed to allow implementation of the above-described relation among the positions of the focal point 23 and the inspection regions. Thereafter, the feed control section 62a relatively moves the chuck table 24 and the focal point 23 along the X-axis by the feed mechanism 6 to cause the focal point 23 to move along the third planned irradiation region 11m. As a result, the inspection regions also move along the boundary between the first planned irradiation region 11k and the second planned irradiation region 11l.

After the relative movement of the chuck table 24 and the focal point 23 along the X-axis is started, the irradiation control section 62b starts irradiation with the laser beam 21 by the laser beam irradiation unit 30 at a timing at which the focal point 23 enters the inside of the outer circumferential edge located on one side of the workpiece 11 in the direction along the X-axis, for example. Thereafter, the irradiation control section 62b stops the irradiation with the laser beam 21 by the laser beam irradiation unit 30 at a timing at which the focal point 23 comes to the outside of the outer circumferential edge located on the other side of the workpiece 11 in the direction along the X-axis.

When the focal point 23 reaches the outer circumferential edge located on the one side of the workpiece 11 in the direction along the X-axis, the inspection region of the first inspection light irradiation unit 46 is positioned to a region (first region) 35a outside relative to the outer circumferential edge located on the one side of the workpiece 11 in the direction along the X-axis. Moreover, the inspection region of the second inspection light irradiation unit 54 is positioned to a region (third region) 35c inside relative to the outer circumferential edge located on the one side of the workpiece 11 in the direction along the X-axis.

Moreover, when the focal point 23 reaches the outer circumferential edge located on the other side of the workpiece 11 in the direction along the X-axis, the inspection region of the first inspection light irradiation unit 46 is positioned to a region (second region) 35b inside relative to the outer circumferential edge located on the other side of the workpiece 11 in the direction along the X-axis. In addition, the inspection region of the second inspection light irradiation unit 54 is positioned to a region (fourth region) 35d outside relative to the outer circumferential edge located on the other side of the workpiece 11 in the direction along the X-axis.

That is, a first detection range 37a in which inspection by the first reflected light detection unit 50 is possible is from the region (first region) 35a outside relative to the outer circumferential edge located on the one side of the workpiece 11 in the direction along the X-axis to the region (second region) 35b inside relative to the outer circumferential edge located on the other side of the workpiece 11 in the direction along the X-axis.

Moreover, a second detection range 37b in which inspection by the second reflected light detection unit 58 is possible is from the region (third region) 35c inside relative to the outer circumferential edge located on the one side of the workpiece 11 in the direction along the X-axis to the region (fourth region) 35d outside relative to the outer circumferential edge located on the other side of the workpiece 11 in the direction along the X-axis.

As illustrated in FIG. 8, the controller 62 includes an inspection section 62c that acquires information included in an electrical signal output by the first light receiving element 52 of the first reflected light detection unit 50 and information included in an electrical signal output by the second light receiving element 60 of the second reflected light detection unit 58. This inspection section 62c determines whether or not the proper separation bands 11h have been formed in the first planned irradiation region 11k and the second planned irradiation region 11l, by using both the information from the first light receiving element 52 and the information from the second light receiving element 60.

Specifically, the inspection section 62c acquires information relating to the intensity of the inspection light 31 that is reflected by the crack 11j of the separation band 11h in the first detection range 37a and is detected by the first light receiving element 52 of the first reflected light detection unit 50. Moreover, the inspection section 62c acquires information relating to the intensity of the inspection light 31 that is reflected by the crack 11j of the separation band 11h in the second detection range 37b and is detected by the second light receiving element 60 of the second reflected light detection unit 58.

Here, in the range from the region 35a to the region 35c, the information relating to the intensity of the inspection light 31 reflected by the crack 11j is acquired by only the first light receiving element 52 of the first reflected light detection unit 50. Moreover, in the range from the region 35b to the region 35d, the information relating to the intensity of the inspection light 31 reflected by the crack 11j is acquired by only the second light receiving element 60 of the second reflected light detection unit 58.

Meanwhile, in the range from the region 35c to the region 35b, the information relating to the intensity of the inspection light 31 reflected by the crack 11j is acquired by both the first light receiving element 52 of the first reflected light detection unit 50 and the second light receiving element 60 of the second reflected light detection unit 58. That is, the inspection section 62c can acquire the information relating to the intensity of the inspection light 31 reflected by the crack 11j of the separation band 11h in the whole of the range from the region 35a to the region 35d.

In other words, the inspection section 62c can acquire the information relating to the intensity of the inspection light 31 reflected by the crack 11j of the separation band 11h at the whole of the boundary between the first planned irradiation region 11k and the second planned irradiation region 11l from the outer circumferential edge located on the one side of the workpiece 11 in the direction along the X-axis to the outer circumferential edge located on the other side of the workpiece 11 in the direction along the X-axis (whole of the planned formation region in which the separation bands 11h should be formed).

In the present embodiment, the inspection section 62c averages the information acquired by the first reflected light detection unit 50 and the information acquired by the second reflected light detection unit 58 in the range from the region 35c to the region 35b. Averaging the information obtained in an overlapping manner as above enhances the accuracy of the inspection. Only one of the information acquired by the first reflected light detection unit 50 and the information acquired by the second reflected light detection unit 58 may be used, of course.

By repeating the procedure like the above-described one, the controller 62 irradiates all planned irradiation regions set in the workpiece 11 with the laser beam 21 to form the separation bands 11h therein and acquires the information relating to the intensity of the inspection light 31 reflected by the crack 11j of the separation band 11h at all boundaries between the planned irradiation regions. After the information relating to the intensity of the inspection light 31 reflected by the crack 11j of the separation band 11h is acquired at each boundary, the inspection section 62c determines whether or not the proper separation bands 11h have been formed at the corresponding boundary.

When determining whether or not the proper separation bands 11h have been formed at the corresponding boundary, first, the inspection section 62c calculates the ratio (percentage) of the region regarded as the region in which the proper separation bands 11h have been actually formed to the planned formation region in which the separation bands 11h should be formed (that is, the corresponding boundary) (step S13).

Here, the intensity of light detected by the first reflected light detection unit 50 or the second reflected light detection unit 58 when the proper crack 11j is present in a freely selected inspection region is higher than the intensity of light detected by the first reflected light detection unit 50 or the second reflected light detection unit 58 when the proper crack 11j is not present in the freely selected inspection region.

Thus, the inspection section 62c calculates the ratio (percentage) of the length (or the area) of the region in which the intensity of detected light exceeds a reference value to the length (or the area) of the planned formation region (the corresponding boundary). That is, the region in which the intensity of detected light exceeds the reference value is regarded as the region in which the proper separation bands 11h have been actually formed.

As the reference value, an optional value between the intensity of light detected by the first reflected light detection unit 50 or the second reflected light detection unit 58 when the proper crack 11j is present in the inspection region and the intensity of light detected by the first reflected light detection unit 50 or the second reflected light detection unit 58 when the proper crack 11j is not present in the inspection region is employed.

Next, the inspection section 62c compares the calculated above-described ratio for the corresponding planned formation region (the boundary) of the subject with a predetermined threshold (step S14). For example, after all planned irradiation regions that are present in the workpiece 11 are irradiated with the laser beam 21, when the calculated ratios for all planned formation regions (boundaries) reach the threshold (YES in the step S14), the controller 62 ends the processing of the workpiece 11 without any operation. The threshold is 80% or higher and is preferably 90% or higher, typically 95%.

On the other hand, when the calculated ratio for any planned formation region (boundary) does not reach the threshold (NO in the step S14), the controller 62 executes reprocessing in which the workpiece 11 is irradiated with the laser beam 21 again and/or adjustment of the processing condition (step S15). Typically, the reprocessing of the workpiece 11 is executed only for the planned irradiation regions adjacent to the planned formation region (boundary) for which the ratio does not reach the threshold. All planned irradiation regions may be reprocessed, as a matter of course. It is desirable that re-inspection of the planned formation region (boundary) corresponding to the reprocessed planned irradiation regions be executed after the reprocessing.

As the processing condition to be adjusted, typically there are the output power of the laser beam 21, and so forth. When the ratio does not reach the threshold, increasing the output power of the laser beam 21 facilitates formation of the proper separation band 11h. Another processing condition such as the repetition frequency of the laser beam 21, the number of times of irradiation of each planned irradiation region with the laser beam 21 (the number of passes), or the feed rate of the chuck table 24 in the direction along the X-axis may be adjusted.

This adjustment of the processing condition may be executed in a form according to the ratio. For example, the processing condition is adjusted with a large adjustment amount when the ratio is low, and the processing condition is adjusted with a small adjustment amount when the ratio is high. Storing a table or the like indicating the relation between the ratio and the adjustment amount of the processing condition in the storing device 66 allows the controller 62 to take this table or the like into consideration and adjust the processing condition with a proper adjustment amount according to the ratio. Moreover, when the ratio is significantly low, the controller 62 may inform the operator of the laser processing apparatus 2 of this situation.

As above, the laser processing apparatus 2 according to the present embodiment includes the first reflected light detection unit 50 having the first light receiving element 52 that detects the inspection light 31 reflected by the crack 11j in the inspection region located on one side of the focal point 23 in the direction along the X-axis and the second reflected light detection unit 58 having the second light receiving element 60 that detects the inspection light 31 reflected by the crack 11j in the inspection region located on the other side of the focal point 23 in the direction along the X-axis.

Thus, when the planned irradiation region in which the laser beam 21 is to be applied from the outer circumferential edge located on the one side of the workpiece 11 in the direction along the X-axis to the outer circumferential edge located on the other side of the workpiece 11 in the direction along the X-axis is irradiated with the laser beam 21 to form the separation band 11h therein, the first light receiving element 52 can be caused to detect the inspection light 31 reflected by the crack 11j in the first detection range 37a from the region (first region) 35a outside relative to the outer circumferential edge located on the one side of the workpiece 11 in the direction along the X-axis to the region (second region) 35b inside relative to the outer circumferential edge located on the other side of the workpiece 11 in the direction along the X-axis, and the second light receiving element 60 can be caused to detect the inspection light 31 reflected by the crack 11j in the second detection range 37b from the region (third region) 35c inside relative to the outer circumferential edge located on the one side of the workpiece 11 in the direction along the X-axis to the region (fourth region) 35d outside relative to the outer circumferential edge located on the other side of the workpiece 11 in the direction along the X-axis.

For example, with an existing laser processing apparatus including only the first reflected light detection unit 50 that can inspect the inspection region located on one side of the focal point 23 in the direction along the X-axis, when irradiation of the planned irradiation region with the laser beam 21 is attempted under a condition in which an amount of relative movement of the chuck table 24 and the focal point 23 in the direction along the X-axis is the same, information on the inspection light 31 reflected by the crack 11*j* is acquired in only the first detection range 37*a* from the region 35*a* outside relative to the outer circumferential edge located on the one side of the workpiece 11 to the region 35*b* inside relative to the outer circumferential edge located on the other side of the workpiece 11. That is, in this case, to acquire the information on the inspection light 31 reflected by the crack 11*j* in the whole of the planned formation region of the separation bands 11*h*, the amount of relative movement of the chuck table 24 and the focal point 23 in the direction along the X-axis needs to be increased.

In contrast, in the laser processing apparatus 2 according to the present embodiment, when the separation band 11*h* is formed in the workpiece 11, the information on the inspection light 31 reflected by the crack 11*j* can be acquired in the whole of the planned formation region of the separation bands 11*h* without increasing the amount of relative movement of the chuck table 24 and the focal point 23 in the direction along the X-axis differently from the existing laser processing apparatus. That is, according to the laser processing apparatus 2 in accordance with the present embodiment, high productivity can be realized even in the case of concurrently executing the formation of the separation band 11*h* and the inspection of the separation bands 11*h*.

The present invention is not limited to the description of the above-described embodiment and can be carried out with various changes. For example, in the above-described embodiment, two different inspection regions are irradiated with the inspection light 31 by the first inspection light irradiation unit 46 and the second inspection light irradiation unit 54. However, two different inspection regions may be irradiated with the inspection light 31 by splitting the inspection light 31 generated by one inspection light irradiation unit (one light source).

Moreover, in the above-described embodiment, movement of the chuck table (holding unit) 24 in the direction along the X-axis and movement of the chuck table (holding unit) 24 in the direction along the Y-axis are implemented by the feed mechanism 6. However, movement of part (or whole) of the laser beam irradiation unit 30 in the direction along the X-axis and movement of part (or whole) of the laser beam irradiation unit 30 in the direction along the Y-axis may be implemented by another feed mechanism. Moreover, movement of the chuck table 24 in the direction along the X-axis (or movement thereof in the direction along the Y-axis) may be implemented by the feed mechanism 6, and movement of part (or whole) of the laser beam irradiation unit 30 in the direction along the Y-axis (or movement thereof in the direction along the X-axis) may be implemented by another feed mechanism.

Moreover, the laser processing apparatus 2 may be configured in such a manner that the arrangement and so forth of the first inspection light irradiation unit 46, the first reflected light detection unit 50, the second inspection light irradiation unit 54, and the second reflected light detection unit 58 are automatically adjusted in conformity with the processing condition and so forth of the workpiece 11. For example, if the positions of the inspection regions are allowed to be automatically adjusted in conformity with change in the interval between the planned irradiation regions of the laser beam 21 in the direction along the Y-axis when this change is made, work of adjusting the positions of the inspection regions becomes unnecessary.

Moreover, when the first reflected light detection unit 50 and the second reflected light detection unit 58 are configured to be capable of generating an image of the inspection region, the controller 62 may process the obtained image to calculate the ratio (percentage) of the region regarded as the region in which the proper separation bands 11*h* have been actually formed to the planned formation region in which the separation bands 11*h* should be formed.

Figure 11:
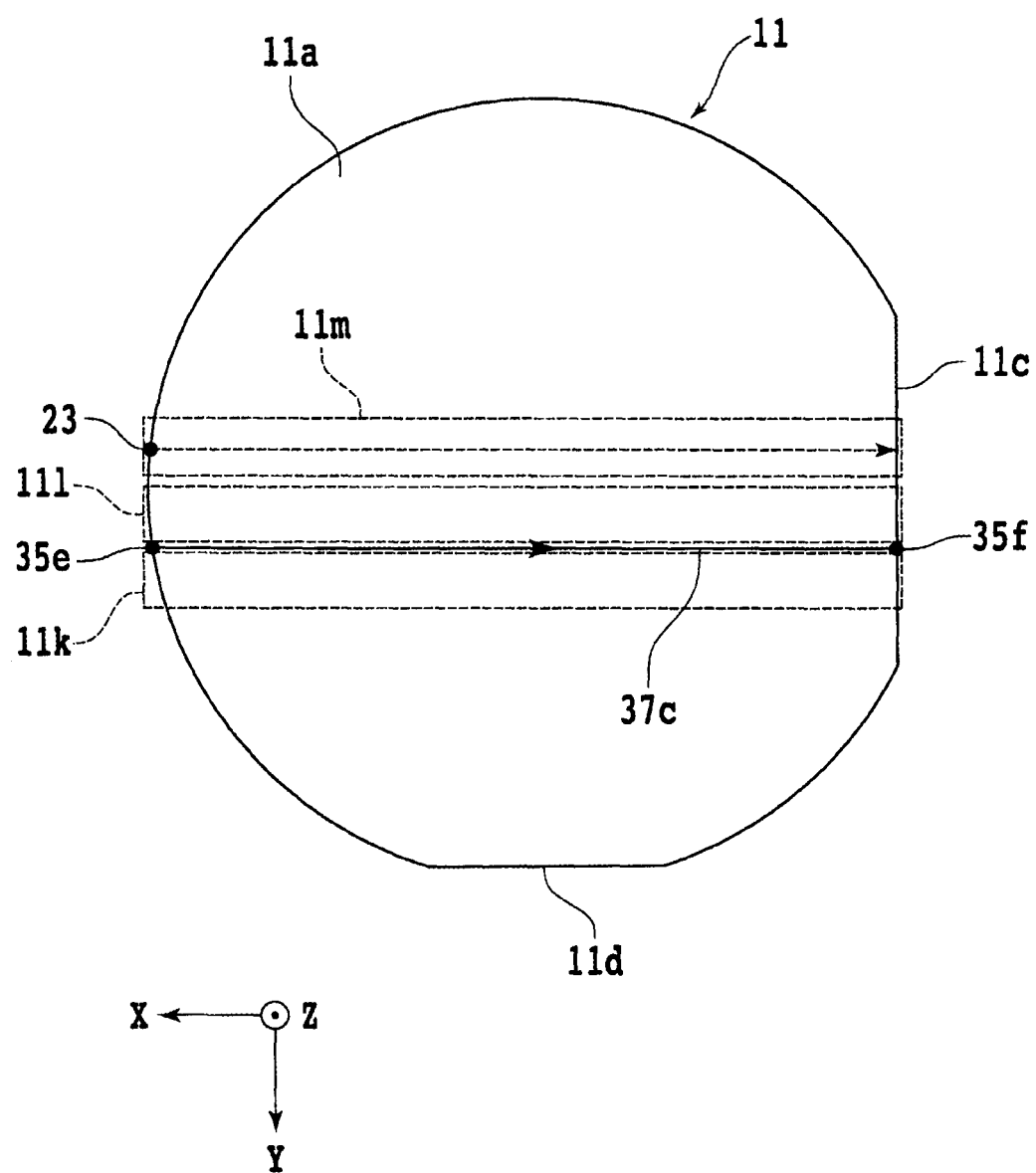
FIG. 11 is a plan view schematically illustrating a state in which the separation bands are inspected in a modification example.

Moreover, although high productivity is realized by the first reflected light detection unit 50 and the second reflected light detection unit 58 in the above-described embodiment, it is also possible to realize high productivity by only one reflected light detection unit (and one inspection light irradiation unit). FIG. 11 is a plan view schematically illustrating a state in which the separation bands 11*h* are inspected in this modification example.

The configuration of a laser processing apparatus according to the modification example is the same as the laser processing apparatus 2 of the embodiment except that the number of inspection light irradiation units and the number of reflected light detection units are each one. Thus, the same constituent elements as those of the laser processing apparatus 2 of the embodiment are given the same numerals, and detailed description of them is omitted.

The inspection light irradiation unit has a light source that can execute irradiation with the inspection light 31. Moreover, an inspection region irradiated with the inspection light 31 from this light source is set to include a region on a straight line that is parallel to the Y-axis and passes through the focal point 23. Moreover, the reflected light detection unit has a light receiving element that can detect the inspection light 31 reflected by the crack 11*j* in the inspection region.

In this laser processing apparatus, as illustrated in FIG. 11, in a state in which the focal point 23 is positioned to the outer circumferential edge located on one side of the workpiece 11 in the direction along the X-axis, the inspection region of the inspection light irradiation unit is positioned to a region 35*e* on the outer circumferential edge located on the one side of the workpiece 11 in the direction along the X-axis. Moreover, in a state in which the focal point 23 is positioned to the outer circumferential edge located on the other side of the workpiece 11 in the direction along the X-axis, the inspection region of the inspection light irradiation unit is positioned to a region 35*f* on the outer circumferential edge located on the other side of the workpiece 11 in the direction along the X-axis.

That is, a detection range 37*c* in which inspection is enabled by the reflected light detection unit of the laser processing apparatus according to the modification example is from the region 35*e* on the outer circumferential edge located on the one side of the workpiece 11 in the direction along the X-axis to the region 35*f* on the outer circumferential edge located on the other side of the workpiece 11 in the direction along the X-axis.

Also in this laser processing apparatus, the controller 62 executes irradiation with the laser beam 21 for a planned irradiation region in which the laser beam 21 is to be applied from the outer circumferential edge located on the one side of the workpiece 11 in the direction along the X-axis to the outer circumferential edge located on the other side of the workpiece 11 in the direction along the X-axis and forms the separation band 11*h* according to a program. At this time, the inspection light 31 reflected by the crack 11*j* is detected by the light receiving element of the reflected light detection unit in the whole of the planned formation region of the separation bands 11*h* from the outer circumferential edge located on the one side of the workpiece 11 in the direction along the X-axis to the outer circumferential edge located on the other side of the workpiece 11 in the direction along the X-axis. This allows the controller 62 to acquire information on the inspection light 31 reflected by the crack 11*j*.

Besides, structures, methods, and so forth according to the above-described embodiment and modification example can be carried out with changes without departing from the range of the object of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus comprising:
   a holding unit having a holding surface which holds a workpiece;
   a laser beam irradiation unit having a laser oscillator which generates a laser beam with such a wavelength as to be transmitted through the workpiece and a light collector which focuses the laser beam generated by the laser oscillator into a focal point, the laser beam irradiation unit executing irradiation in such a manner as to focus the laser beam on an inside of the workpiece held by the holding unit to form a separation band including a modified part arising from modification and cracks which extend from the modified part inside the workpiece;
   a feed mechanism which relatively moves the holding unit and the focal point of the laser beam along an X-axis and a Y-axis that intersects the X-axis;
   an inspection light irradiation unit which has a light source that generates inspection light with such a wavelength as to be transmitted through the workpiece, and irradiates an inspection region including the separation band formed in the workpiece with the inspection light;
   a first reflected light detection unit having a first light receiving element which detects the inspection light reflected by the cracks in the inspection region located on one side of the focal point in a direction along the X-axis;
   a second reflected light detection unit having a second light receiving element which detects the inspection light reflected by the cracks in the inspection region located on the other side of the focal point in the direction along the X-axis; and
   a controller which has a processing device and a storing device and controls each constituent element according to a program stored in the storing device,
   wherein the first and the second reflected light detection units are arranged in a manner that the light collector is sandwiched between the first and the second reflected light detection units in the direction along the X-axis, and
   wherein, according to the program,
   in forming the separation band through executing irradiation with the laser beam for a planned irradiation region in which the laser beam is to be applied from an outer circumferential edge located on the one side of the workpiece in the direction along the X-axis to the outer circumferential edge located on the other side of the workpiece in the direction along the X-axis,
   the controller acquires information on the inspection light reflected by the cracks in whole of a planned formation region of the separation band from the outer circumferential edge located on the one side of the workpiece in the direction along the X-axis to the outer circumferential edge located on the other side of the workpiece in the direction along the X-axis,
   by causing the first light receiving element to detect the inspection light reflected by the cracks in a first detection range from a first region outside relative to the outer circumferential edge located on the one side of the workpiece in the direction along the X-axis to a second region inside relative to the outer circumferential edge located on the other side of the workpiece in the direction along the X-axis, and
   by causing the second light receiving element to detect the inspection light reflected by the cracks in a second detection range from a third region inside relative to the outer circumferential edge located on the one side of the workpiece in the direction along the X-axis to a fourth region outside relative to the outer circumferential edge located on the other side of the workpiece in the direction along the X-axis.

2. The laser processing apparatus according to claim 1, wherein, according to the program,
   the controller calculates a ratio of a region regarded as a region in which the separation band has been actually formed to the planned formation region by using the information acquired.

3. The laser processing apparatus according to claim 2, wherein, according to the program,
   the controller irradiates a region in which the ratio does not reach a threshold with the laser beam again when the ratio does not reach the threshold.

4. The laser processing apparatus according to claim 2, wherein, according to the program,
   the controller adjusts a processing condition when the ratio does not reach a threshold.

5. The laser processing apparatus according to claim 1, wherein
   the first light receiving element and the second light receiving element are configured to be capable of detecting the inspection light reflected by the cracks located on one side of the focal point in a direction along the Y-axis.

6. The laser processing apparatus according to claim 1, wherein
   the first light receiving element and the second light receiving element are configured to be capable of detecting intensity of the inspection light reflected by the cracks.

7. The laser processing apparatus according to claim 1, wherein
   the first light receiving element and the second light receiving element are configured to be capable of generating an image of the inspection region by using the inspection light reflected at the inspection region including the cracks.

8. The laser processing apparatus according to claim 1, wherein, according to the program, the controller acquires information on the inspection light reflected by the cracks:
   by causing only the first light receiving element to detect the inspection light reflected by the cracks in a range from the first region to the third region, and by causing only the second light receiving element to detect the inspection light reflected by the cracks in a range from the second region to the fourth region.

9. The laser processing apparatus according to claim 1, wherein the first light receiving element and the second light receiving element are light emitting diodes.

10. A laser processing apparatus comprising:
a holding unit having a holding surface which holds a workpiece;
a laser beam irradiation unit having a laser oscillator which generates a laser beam with such a wavelength as to be transmitted through the workpiece and a light collector which focuses the laser beam generated by the laser oscillator into a focal point, the laser beam irradiation unit executing irradiation in such a manner as to focus the laser beam inside of the workpiece held by the holding unit to form a separation band including a modified part arising from modification and cracks which extend from the modified part inside the workpiece, such that a proper crack is one of the cracks which extends to a boundary line of the separation band;
a feed mechanism which relatively moves the holding unit and the focal point of the laser beam along an X-axis and a Y-axis that intersects the X-axis;
an inspection light irradiation unit which has a light source that generates inspection light with such a wavelength as to be transmitted through the workpiece, and irradiates an inspection region including the separation band formed in the workpiece with the inspection light;
a reflected light detection unit having a light receiving element which detects the inspection light reflected by the cracks in the inspection region including a region on a straight line that is parallel to the Y-axis and passes through the focal point; and
a controller which has a processing device and a storing device and controls each constituent element according to a program stored in the storing device,
wherein, according to the program,
in forming the separation band through executing irradiation with the laser beam for a planned irradiation region in which the laser beam is to be applied from an outer circumferential edge located on one side of the workpiece in a direction along the X-axis to the outer circumferential edge located on the other side of the workpiece in the direction along the X-axis,
the controller acquires information on the inspection light reflected by the cracks by causing the light receiving element to detect the inspection light reflected by the cracks in whole of a planned formation region which includes the entire boundary line of the separation band from the outer circumferential edge located on the one side of the workpiece in the direction along the X-axis to the outer circumferential edge located on the other side of the workpiece in the direction along the X-axis, such that when the inspection light reflected from one of the cracks has a predetermined intensity, the one of the cracks is determined to be the proper crack, and
the controller calculates a ratio of a properly formed length regarded as a region in which the cracks are proper cracks and the separation band has been actually formed to a length of the planned formation region by using the information acquired.

11. The laser processing apparatus according to claim 10, wherein, according to the program,
the controller irradiates a region in which the ratio does not reach a threshold with the laser beam again when the ratio does not reach the threshold.

12. The laser processing apparatus according to claim 10, wherein, according to the program,
the controller adjusts a processing condition when the ratio does not reach a threshold.

13. The laser processing apparatus according to claim 10, wherein:
the light receiving element is configured to be capable of detecting intensity of the inspection light reflected by the cracks.

14. The laser processing apparatus according to claim 10, wherein;
the light receiving element is configured to be capable of generating an image of the inspection region by using the inspection light reflected at the inspection region including the cracks.

15. A laser processing apparatus comprising:
a holding unit having a holding surface which holds a workpiece;
a laser beam irradiation unit having a laser oscillator which generates a laser beam with such a wavelength as to be transmitted through the workpiece and a light collector which focuses the laser beam generated by the laser oscillator into a focal point, the laser beam irradiation unit executing irradiation in such a manner as to focus the laser beam on an inside of the workpiece held by the holding unit to form a separation band including a modified part arising from modification and cracks which extend from the modified part inside the workpiece, such that a proper crack is one of the cracks which extends to a boundary line of the separation band;
a feed mechanism which relatively moves the holding unit and the focal point of the laser beam along an X-axis and a Y-axis that intersects the X-axis;
an inspection light irradiation unit which has a light source that generates inspection light with such a wavelength as to be transmitted through the workpiece, and irradiates an inspection region including the separation band formed in the workpiece with the inspection light;
a first reflected light detection unit having a first light receiving element which detects the inspection light reflected by the cracks in the inspection region located on one side of the focal point in a direction along the X-axis;
a second reflected light detection unit having a second light receiving element which detects the inspection light reflected by the cracks in the inspection region located on the other side of the focal point in the direction along the X-axis; and
a controller which has a processing device and a storing device and controls each constituent element according to a program stored in the storing device,
wherein, according to the program,
in forming the separation band through executing irradiation with the laser beam for a planned irradiation region in which the laser beam is to be applied from an outer circumferential edge located on the one side of the workpiece in the direction along the X-axis to the outer circumferential edge located on the other side of the workpiece in the direction along the X-axis,
the controller acquires information on the inspection light reflected by the cracks in whole of a planned formation region which includes the entire boundary line of the separation band from the outer circumferential edge located on the one side of the workpiece in the direction along the X-axis to the outer circumferential edge located on the other side of the workpiece in the direction along the X-axis, by causing the first light receiving element to detect the inspection light reflected by the cracks in a first detection range from a first region outside relative to the outer circumferential edge located on the one side of the workpiece in the direction along the X-axis to a second region inside relative to the outer circumferential edge located on the other side of the workpiece in the direction along the X-axis, by causing the second light receiving element to detect the inspection light reflected by the cracks in a second detection range from a third region inside relative to the outer circumferential edge located on the one side of the workpiece in the direction along the X-axis to a fourth region outside relative to the outer circumferential edge located on the other side of the workpiece in the direction along the X-axis, such that when the inspection light reflected from one of the cracks has a predetermined intensity, the one of the cracks is determined to be the proper crack, and the controller calculates a ratio of a properly formed length regarded as a region in which the cracks are proper cracks and the separation band has been actually formed to a length of the planned formation region by using the information acquired.

16. The laser processing apparatus according to claim 10, wherein the first light receiving element is a light emitting diode.

\* \* \* \* \*